May 18, 1948. J. J. CANTOR 2,441,866
DEVICE FOR PROTECTING THE EAR DRUM
Filed June 4, 1943 2 Sheets-Sheet 1

JACOB J. CANTOR,
INVENTOR.

BY

ATTORNEY.

May 18, 1948. J. J. CANTOR 2,441,866
DEVICE FOR PROTECTING THE EAR DRUM
Filed June 4, 1943 2 Sheets-Sheet 2

JACOB J. CANTOR,
INVENTOR.

BY *P.C.Weilein*

ATTORNEY.

Patented May 18, 1948

2,441,866

UNITED STATES PATENT OFFICE 2,441,866

DEVICE FOR PROTECTING THE EAR DRUM

Jacob J. Cantor, Los Angeles, Calif.

Application June 4, 1943, Serial No. 489,596

1 Claim. (Cl. 128—152)

This invention relates to ear plugs or closures for the auditory canal.

It is an object of this invention to provide an improved ear plug which is easily inserted, which will not injure the lining of the auditory canal, and which is effective to protect the ear drum from excessive noise, or from momentary excess air pressure due to concussion or the like.

It is another object of this invention to provide an ear plug which functions in an improved manner to exclude water from the ears, and hence which can be used as an effective ear stopple for swimmers.

To satisfactorily fulfill either of these objects, it is necessary that the ear plug be in intimate contact with the wall of the auditory canal to form a tight seal. One difficulty in preparing a satisfactory ear plug is the fact that the auditory canal is not a straight round tube but follows in general an S pattern directed medialwards. Thus, the external part of the canal is inclined forwardly and slightly upwards; the intermediate part is directed backwardly, and the internal part (the longest) slopes forwardly and slightly downward. Besides these bends, the surface of the external portion of the canal, where a plug must be placed, is uneven due to the protuberances marking the position of the underlying cartilagenous and bony structure of the external auditory meatus. Other factors interfering with maintaining an ear plug in proper sealing contact with the walls of the canal is the tendency of the tragus to exert pressure posteriorly on any part of the plug projecting outwardly into the area of the cavium conchae. Also the fact that the ear canal changes its form and size with the movement of the mandible.

It is thus another object of this invention to provide an ear plug which is capable of accommodating itself to the turns and bends of the canal as well as to the projections on the canal wall, and further the movements of the canal wall.

It is still another object of this invention to provide an ear plug which makes contact with a substantial area of the canal wall.

Another difficulty heretofore encountered with ear plugs of the type intended to make a tight seal with the wall of the auditory canal, is due to the fact that the normal auditory canal is closed in an air tight manner at its inner end by the tympanic membrane or ear drum, which is extremely sensitive to changes in pressure. Thus, the introduction of an object into the canal which fits the canal in an air tight manner is very painful, due to the entrapment and compression of air between the ear drum and the object so inserted. It is accordingly another object of this invention to provide an ear plug arranged to prevent entrapment of air between the plug and ear drum during insertion of the plug.

It is still another object of this invention to provide an ear plug which is soft and flexible, to guard against possible injury to the lining of the auditory canal or other parts, and which has improved sound absorbing properties.

It is still another object of this invention to provide in one modification thereof, an ear plug in which a blast of air resulting from a concussion, explosion or the like, acts to improve the seal between the plug and the auditory canal.

It is still another object of this invention to provide in another modification thereof, an ear plug which will permit equalization of the air pressure on both sides of the ear drum, after the plug is in place.

It is still another object of this invention to provide an improved sound absorbing material.

It is a still further object of this invention to provide a sound absorbing material which is resilient.

It is a still further object of this invention to provide a sound absorbing material formed of comminuted material and including means to prevent such material from packing or forming masses.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense, since the scope of the invention is best defined by the appended claim.

Referring to the drawings.

Figure 1:
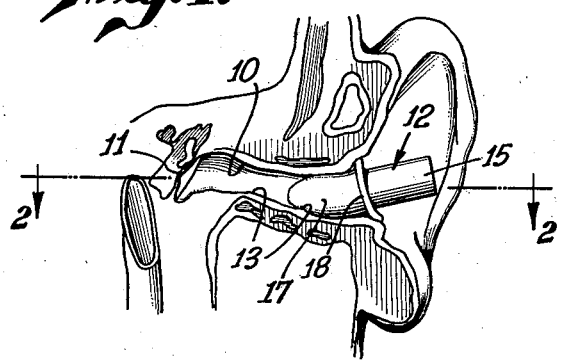
Figure 1 is a substantially vertical section through the auditory canal, showing an ear plug incorporating the invention in place.
Figure 4:
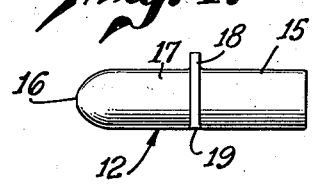
Figure 4 is an elevation of an ear plug incorporating the invention.
Figure 2:
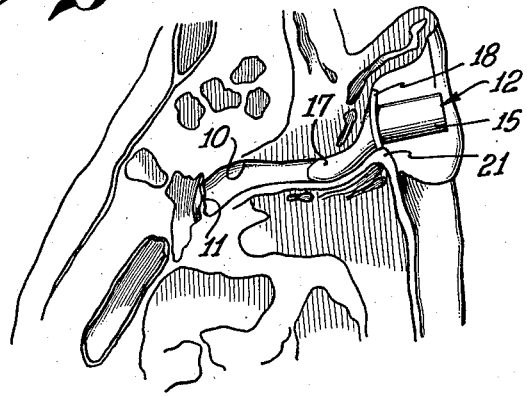
Figure 2 is a horizontal section, taken on line 2—2 of Figure 1.
Figure 5:
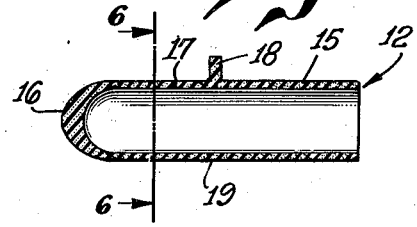
Figure 5 is a longitudinal section through a plug incorporating one form of the invention.
Figure 6:
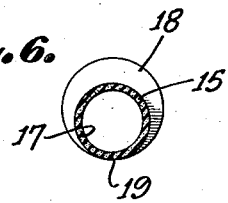
Figure 6 is a cross section taken on line 6—6 of Figure 5.

Referring to Figures 1 and 2 of the drawings, a portion of a human head adjacent the ear is shown in section, the auditory canal indicated by 10, being closed at its inner end by the ear drum 11. The outer end of the canal 10 is closed by a plug or closure 12 incorporating the invention. As shown in these figures, the canal 10 follows a reversely curved path and is of varying cross section. Further, the walls of the canal are not smooth, but are rendered irregular by various protuberances as indicated by 13.

Figure 3:
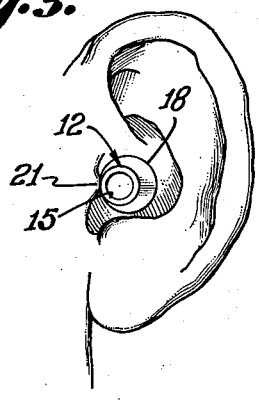
Figure 3 is a fragmentary elevation of the ear, showing the device in place, being a view taken generally from the right of Figure 1.

Referring to Figures 4 to 8, it will be seen that the plug 12 comprises a generally cylindrical tube 15 closed at one end by a wall 16 which is outwardly convex to facilitate insertion of the plug in the ear and open at its opposite end. It is to be understood that the plug is made of soft resilient material such as rubber and that the portion 17 of the wall of the tube 15 which enters the canal is relatively thin. For example, a rubber wall having a thickness of .024″ has been found to be satisfactory. This enables the plug 12 to adapt itself to the irregularities of the inner surface of the canal 10 and the plug thereby establishes a circumferential seal with the canal wall over a substantial area along the length of the canal, as will appear from an inspection of Figures 1 and 2. Furthermore, this resilience enables the plug to maintain such contact regardless of movements of the canal wall or changes in shape of the canal incident to movement of the jaws. To limit movement of the plug 12 into the canal 10, an external projection or flange 18 is provided on the tube 15 intermediate its ends. To permit more satisfactory placement of the ear plug in the canal as well as to prevent exertion of pressure on the external portion of the plug, the flange 18 need not be made to extend entirely about the periphery of the tube 15, but may be omitted over a part thereof, as indicated at 19. This allows the plug 12 to freely pass the tragus indicated by 21 in Figures 2 and 3.

Figure 7:
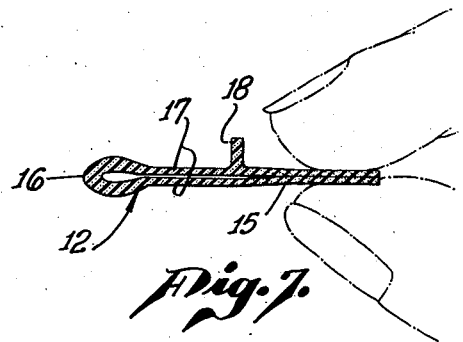
Figure 7 is a view similar to Figure 5 but showing the device as it may be collapsed for placement in the ear.
Figure 8:
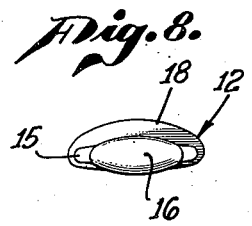
Figure 8 is a front elevation of the device of Figure 7.

When it is desired to insert the plug 12 in the ear, the plug may be flattened to about the form shown in Figures 7 and 8. This is accomplished by first pinching the closed end between the thumb and forefinger of one hand, forcing most of the air out of the tube 15. The open end of the tube may be then closed in an air tight manner by pinching the outer portion of the tube together between the thumb and finger as illustrated in Figure 7. This prevents reentry of air into the tube 15, thereby maintaining the plug flattened. It can then be readily inserted in the ear, since the cross section of the tube 15 in this condition is smaller than that of the auditory canal 10. Further, a free passage between the plug 12 and the wall of the canal 10 is thus provided so that no air is compressed between the plug 12 and the ear drum 11 as the plug is inserted. After insertion in the ear, the outer end of the tube 15 is released allowing air to enter the tube 15, so that the wall 17 expands, due to its resilience, into intimate contact with the inner surface of the canal 10. It will be readily understood that in this condition, plug 12 effectively seals and closes the canal 10. Obviously, the plug 12 may be used to prevent entry of water into the ears, as for example, of a diver or swimmer.

It will be apparent that when the plug 12 is in position in the ear, any appreciable movement of the plug 12 or of the end wall 16 with respect to the tube 15 toward or away from the ear drum 11, will act upon the air confined between the plug and the ear drum, to produce changes of pressure on the ear drum. It is necessary to prevent such movement of the end wall 16, as otherwise the important purpose of the plug will not be achieved. Thus, it is necessary particularly to prevent strong blasts of air, such as those caused by concussions, from so moving wall 16 of the plug, as otherwise damage or injury to the ear drum may result. For this purpose the end wall 16, in one form of the invention, is made stiffer than the tube wall 17. For example, if the plug 12 is made entirely of rubber, a satisfactory thickness for the wall 16 has been found to be about four times the thickness of the wall 17 (see Figure 5). Further, the opposite end of the tube 15 has a large opening for freely admitting air pressure from such blasts to the interior of the plug.

It is believed that due to the greater yieldability of the wall 17 as compared with that of end wall 16, increase of pressure within the plug 12 causes this wall to be expanded to more tightly engage the surface of the canal 10, thereby preventing such pressure from forcing the plug as a unit further into the canal, as well as preventing longitudinal or axial stretching of the wall 17 by the pressure acting on the wall 16, so that the wall 16 is not displaced. Further, it is preferred that the open end of the tube 15 be entirely unobstructed so that no barrier is presented upon which the blast may act to force the plug bodily into the ear. The stiffness of the wall 16 is such that this wall is not deformed by the pressure. Thus, since this end wall 16 is neither deformed nor displaced by momentary increase of air pressure, the ear drum is protected from the effects of concussions or the like. Due to the large opening into the plug 12, the tendency for such blasts to pass between the wall of the plug and the wall of the canal is greatly reduced; also, the effectiveness of the seal between these walls is improved by the increased pressure, as just described.

Figure 9:
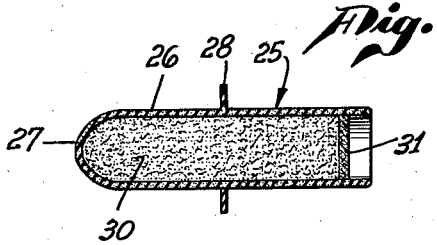
Figures 9 and 10 are views similar to Figure 5 but showing modified forms of the invention.
Figure 10:
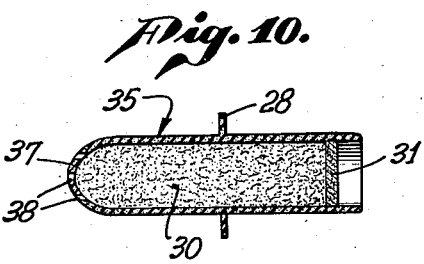
Figure 11:
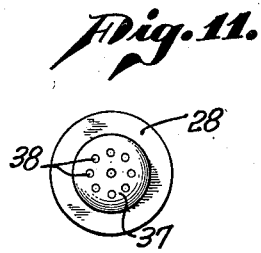
Figure 11 is an elevation of the device of Figure 10, taken from the left.

In the event that it is not necessary to guard against concussion, artillery fire and such, but it is only required to protect the ears against industrial noises such as that of riveters or machinery, that form of the invention illustrated in Figures 9 to 11 may be used. In Figure 9, a plug 25 is shown including a thin walled tubular member 26 of resilient material with a rounded integral end wall 27 and a limiting flange 28. However, in this form, the end wall 27 may be substantially the same thickness as the tube wall, while flange 28 may be thinner than the wall of tube 26. Thus, the flange 28 is sufficiently flexible to readily pass the tragus and can extend completely around the plug. A filling of porous sound absorbent material 30 is placed in the member 26, being retained therein by a porous plug 31 such as of felt or other suitable material secured in the open end of the tube 26. The material 30 is resilient to permit the tube 26 to be compressed for insertion in the ear without impairing the sound absorbent quality of the plug. This form of plug cannot be flattened for such insertion to as great a degree as was the first form described, but can be readily compressed to reduce its cross section rendering insertion in the auditory canal 10 easy and at the same time provide a passage to permit the air in the canal to escape as the plug is inserted.

In Figures 10 and 11, a plug 35 similar to that just described is provided and is filled with similar sound absorbent material 30. In this form of the invention, the end wall 37 is perforated as indicated by 38. Since the felt plug 31 is quite porous, air can thus pass through the plug 35 to and from the space in the canal 10 between the plug 35 and the ear drum 11. Since the other side of the ear drum 11 is subjected to atmospheric pressure at all times through the nose and Eustachian tube, this plug permits equalization of pressure on opposite sides of the drum 11. Thus, a person using the plug suffers no discomfort due to pressure changes of the atmosphere in which he works.

Due to the small amount of sound absorbent material 30 which it is possible to use in a plug, this material must be very effective for the plug to be of any use in guarding the ear against noise. Also, this material must be resilient as previously pointed out, so that the filled plug can adjust itself to the projections and turns of the auditory canal, and can be inserted in the manner set forth. Accordingly, a novel material is provided which will now be described in detail.

As is well understood, sound has many of the characteristics of light and energy, in that it can be reflected, refracted and absorbed. Sound has the quality of being able to move along or through solids, and its velocity is decreased by passing through long narrow passages. Further, sound exerts pressure, and hence its energy can be dissipated by causing it to contact suitable materials. Most sound absorbent materials depend for their efficiency upon the fact that they are perforated by numerous small holes. It has been found that the sound absorbent quality of a material depends on the size and length of such holes.

In the instant case, an important ingredient of the sound absorbent material or mixture 30 is a resilient material formed with innumerable pores or holes of minute size. Such a material may be for example "air foam" rubber. Since discontinuity is an important feature in a truly sound absorbent material, this ingredient is ground or otherwise broken up into very small particles. Each of these particles may be considered as surrounded by a thin film of air, introducing another medium into the field. Since sound, like light, may be reflected and refracted when passing from one medium to another, the passage of sound through the material involves a large number of reflections and refractions.

As is well known, when a sound wave strikes a medium of different density from that in which it has been traveling, only a part of the energy or pulse goes on into the new medium, and the remainder is propagated backward through the first medium in the form of a reflected wave in precisely the same way as that in which the original pulse was propagated forward. Thus, by utilizing a mass of small, porous, irregular particles surrounded and permeated by air, a material is provided which lacks homogeneity; this lack of homogeneity results in a dissipation of the energy of the sound waves by repeated reflections from materials of different density.

To further promote discontinuity and lack of homogeneity of the sound absorbent material, short lengths of fibrous material are introduced into the mixture. These cooperate to form mesh or irregular networks or webs extending through the mixture in all directions and which further dissipate the sound energy. These fibers also assist in preventing the mass from packing. Fibers of the bark of the redwood tree have been found satisfactory for such use, particularly since this material has sound absorbing characteristics of its own.

Since sound has the property of exerting force, any solid particle not in direct contact with another such particle will absorb some of the sound energy. Accordingly, it is desirable to add a finely divided heavy substance to the mixture to increase its sound absorbent properties. Such additional material also increases the lack of homogeneity. Such a substance to be suitable must not be toxic, and must not be resonant. Experiment has shown that salts of some of the heavy metals are suitable, barium sulphate apparently having all the desired characteristics. Accordingly, the particles of air foam rubber and the fibres are coated, at least partly, with barium sulphate. Thus, the multitudinous nets or webs are loaded with heavy material which further assists them in dispersing the sound energy.

Figure 12:
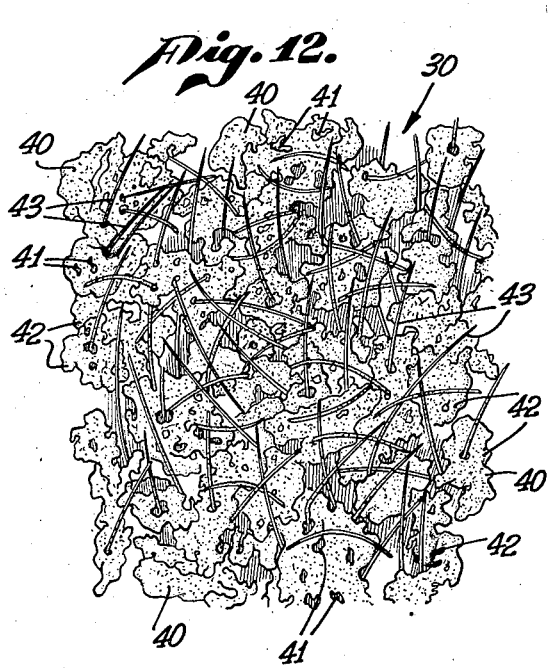
Figure 12 is a view of a fragment of the improved sound absorbing material, greatly magnified.

Figure 12 is a copy of an enlarged photograph of a fragment of the sound absorbent mixture 30. Therein, the particles of air foam rubber are indicated by 40, a few of the innumerable pores therein being marked 41. Flecks of the metal salt are indicated by 42 and the fibrous material by 43.

This mixture 30 is fed into the plug 25 or plug 35 by gravity, so that any tendency to pack during filling is avoided. In this way the resilience of the material acts to maintain the plug in shape, at the same time it is soft and flexible so as to be readily conformable to the shape and irregularities of the auditory canal, and has no resonant characteristics.

Figure 13:
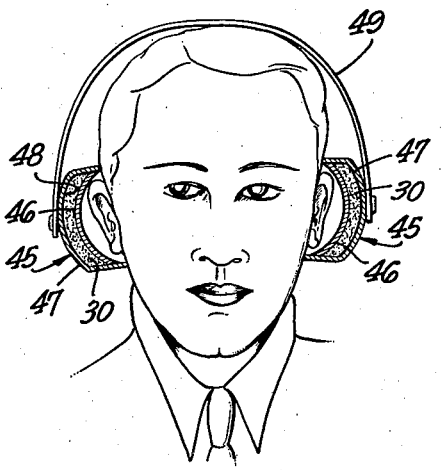
Figure 13 is a view partly in section showing a further modified form of the invention.

Figure 13 shows a modified form of device for utilizing the sound absorbent mixture. Therein, a pair of ear muffs or caps 45 are disposed on the opposite sides of a wearer's head and are arranged to cover the ears. Each cap 45 has an inner wall 46 and outer wall 47 which cooperate to define a space 48 which is filled with the sound absorbing mixture 30. Caps 45 are joined by a flexible band 49 which serves to retain them in place. These caps 45 may include ear phones in the manner of telephone and radio operators head sets, if desired.

I claim:

An ear stopper including a tubular portion adapted to be inserted in the ear canal and having a thin resilient wall adapted to conform closely to the surface of said canal; a wall across the inner end of said portion; a projecting flange on said tubular portion spaced from the inner end thereof, to limit the insertion of said portion in said canal; a body of resilient, sound absorbent material in said portion; which portion with contained absorbent material retains its resilience and ability to conform closely to the ear canal;

and means forming an air passage through said stopper, communicating with the exterior thereof on opposite sides of the canal engaging portion to permit equalization of pressures inside and outside the ear, said means including a restricted opening through the end wall and a passage through said body of material.

JACOB J. CANTOR.

REFERENCES CITED

The following references are of record in the file of this patent:

UNITED STATES PATENTS

| Number | Name | Date |
|---|---|---|
| 302,738 | King | July 29, 1884 |
| 441,163 | Johns | Nov. 25, 1890 |
| 2,230,738 | Baum | Feb. 4, 1941 |
| 2,246,736 | Knudsen | June 24, 1941 |

FOREIGN PATENTS

| Number | Country | Date |
|---|---|---|
| 66,949 | Germany | Feb. 4, 1893 |
| 6,312 | Netherlands | July 30, 1921 |